Oct. 6, 1936.   E. L. MÜLLER   2,056,434
LUBRICATING APPARATUS
Filed March 11, 1935

INVENTOR:
Eugen Ludwig Müller
By [signature]
Attorney

Patented Oct. 6, 1936

2,056,434

UNITED STATES PATENT OFFICE 2,056,434

LUBRICATING APPARATUS

Eugen Ludwig Müller, Berlin, Germany

Application March 11, 1935, Serial No. 10,507
In Germany September 5, 1934

8 Claims. (Cl. 184—33)

This invention relates to pumps for supplying lubricant to the bearings of machines. It is particularly concerned with reciprocating pumps the pistons of which also turn, and by so doing act as valves opening and closing the inlet and outlet passages of the pumps.

According to one feature of the invention two or more such pumps are operated by a common shaft; the axes of the pumps are parallel with that of the shaft and equidistant from it; and the pump pistons and the shaft carry intermeshing gear wheels by which the pistons are turned, and cams of equal pitch rolling one upon the other by which linear movement, at least in one direction, namely the pressure stroke, is communicated to the pistons.

Movement in the opposite direction may be communicated by a cam on the common shaft engaging a plane disc upon the pump piston, and this may be adjustable along the piston, for instance being formed as a nut screwing upon the piston, to adjust the length of stroke of the pump.

Where the lubricant reservoir is below the pumps one or more of them may be constructed as suction pumps to lift lubricant from the reservoir and supply it to the pressure pumps; for these, being designed for forwarding relatively minute quantities, have little or no lift, especially if their stroke is variable, and may be unable to draw lubricant from a reservoir placed, as is usually convenient, in the pedestal of a machine. The suction pump is made of sufficient diameter and sufficient length of stroke to supply all the pressure pumps fed from it to their full capacity; and its stroke is not made variable so that its clearance or dead space may be constant and small and its suction lift consequently considerable.

To prevent wrong assembly the gear wheels conveying rotary motion from the common cam shaft to the several pistons are made with irregular teeth so that they can only co-operate when assembled in proper timed relation. The driving and driven wheels may have a 1:1 ratio, so that the pumps make one complete reciprocation for each turn of the cam shaft; but this limits the number of pumps that can be accommodated around and driven from one cam shaft. If more pumps are needed a ratio of 2:1 or 3:1 and so on may be adopted, the cam upon the cam shaft having one or more repeats of its pattern and producing two or more strokes of the pumps per revolution; the irregularity in the gear teeth of the wheel on the cam shaft must be correspondingly duplicated or multiplied.

A further feature of the invention is the actuation of the cam shaft from a machine shaft at right angles to it through a ratchet gear. Driving shaft and cam shaft can then be in one plane, and the pump casing can be symmetrical in form. Moreover the ratchet enables the pumps to be overdriven by hand when desired, and provision may be made for so driving it. The ratchet gear comprises a pawl swung by the driving shaft through a suitable arc of travel, and in one direction of swing engaging a ratchet wheel upon the cam shaft. The pawl may be rocked to engage it with and disengage it from the ratchet teeth by an abutment friction tight upon its support, but capable of following the pawl when engagement or disengagement is complete and the pawl can rock no further.

The suction pump is preferably designed to draw more oil than the pressure pumps fed by it can take. The excess lubricates the cams and gearing by which the pumps are driven and escapes through an overflow to lubricate in turn the ratchet mechanism actuating the driving shaft. A further overflow permits the excess to return to the oil reservoir through a sight glass. This arrangement obviates the care which is necessary to render the pump casing oil-tight when the oil reservoir is above it.

The accompanying drawing illustrates a construction of lubricating apparatus comprising one suction pump and a plurality of pressure pumps exhibiting all the features of the invention above set forth.

Figure 1:
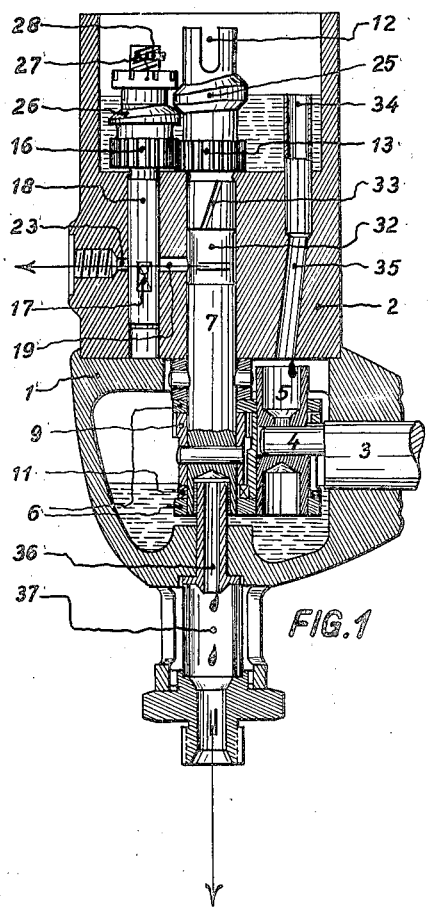
Figure 1 is a section on the line a—b of Figure 3 through one of the pressure pumps, the ratchet driving mechanism and the overflow devices.
Figure 2:
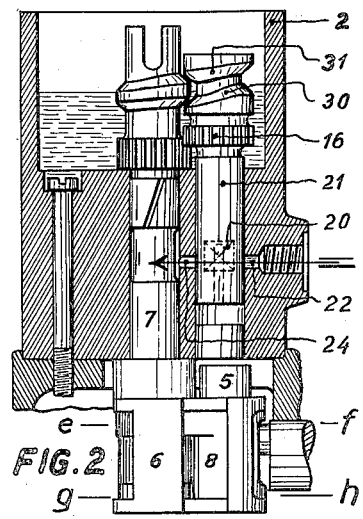
Figure 2 is a section on the line c—d of Figure 3 through the suction pump; the ratchet driving mechanism is shown in elevation its casing being omitted.
Figure 4:
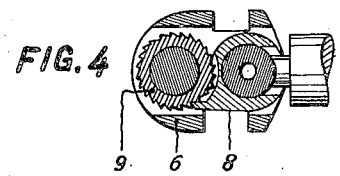
Figure 4 is a section on the line e—f of Figure 2.
Figure 5:
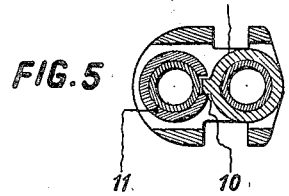
Figure 5 is a section on the line g—h of Figure 2.
Figure 3:
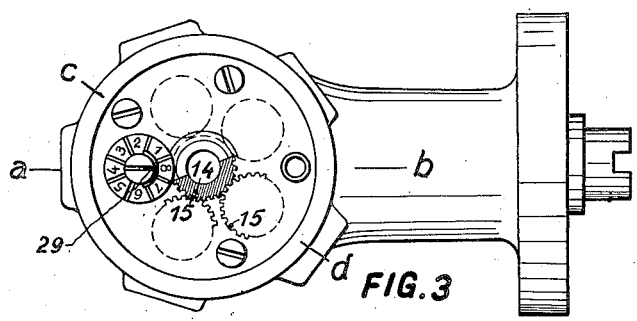
Figure 3 is a plan partly in section showing some of the spur wheels by which the pump pistons are driven.

The driving mechanism is built into a lower casing 1, and the pump cylinders are bored in a block 2 above it. A driving shaft 3 which may be driven from any suitable shaft of the machine to be lubricated, carries an eccentric pin 4 fitting in a transverse bore in a bolt 5. The bolt 5 is revoluble and movable axially in a part 6, which in its turn is revolubly mounted on the cam shaft 7, and carries a pawl 8 which can rock upon a pivot, for instance the bolt 5. The horizontal component of the circular movement of the pin 4 causes oscillation of the pawl carrier 6 about the cam shaft 7. To the shaft 7 is pinned the ratchet wheel 9 in position to be engaged by the pawl 8. The latter has at its lower end a nose 10 which engages between the ends of a spring ring 11 embracing the cam shaft 7 with slight tension. When the pawl carrier 6 is swung clockwise around the cam shaft 7 by the eccentric pin 4 and the bolt 5, the nose 10 abuts upon one end of the spring 11 (the lower end in Figure 5) with the result that the pawl 8 is rocked into engagement with the ratchet wheel 9 (Figure 4). When fully engaged with the teeth the pawl 8 forms with the pawl carrier 6 a rigid whole and the swing of the pawl carrier is transmitted to the cam shaft 7. When the pawl carrier is moved by the eccentric pin anticlockwise the nose 10 first engages against the other end of the spring 11, the pawl is lifted out of the ratchet teeth until the back of its tooth strikes the pawl carrier 6, and the pawl carrier then swings together with the pawl, turning the spring ring on the stationary cam shaft, while the tooth of the pawl passes idly over the teeth of the ratchet wheel. So the driving mechanism works in a four part cycle comprising engagement of the pawl, turning of the cam shaft, lifting of the pawl, and return of the pawl carrier while the cam shaft remains stationary. To provide additional lubrication during working or to fill the lubricant distributing pipes while the machine is stationary the cam shaft 7 may be turned to overrun the ratchet drive. For this purpose a slot 12 is provided at the upper end of the cam shaft 7, with which a crank handle may be engaged. When the handle is turned clockwise the spring ring 11 disengages pawl 8, so that there is no contact between it and the ratchet teeth while the handle is driving.

The cam shaft 7 transmits rotary movement to the pump pistons 18, 21 through spur wheels 13, 16 with irregular teeth; in the construction shown the spur wheel 13 on the cam shaft has a widened tooth space 14 to receive a stouter tooth 15 of each of the spur wheels 16 on the pump pistons.

The pumps may all be pressure pumps; in the example illustrated there are four pressure pumps with pistons 18, and one suction pump with piston 21; there could be more than one suction pump. In the pressure pump pistons 18 are ports 17 which as the piston turns register successively with the oil supply passage 19 and the oil delivery passage 23 respectively. In the piston 21 of the suction pump is a port 20 which as the piston turns registers successively with the inlet channel 22 and the delivery channel 24 of the suction pump. The suction inlet channel 22 is connected by a pipe, not shown, with the oil reservoir. The pressure delivery channels 23 are connected with the several bearings to be lubricated. The delivery channel 24 of the suction pump and the inlet channels 19 of the pressure pumps communicate with an annular space 32 around the cam shaft 7.

The pump pistons are reciprocated, in the construction shown in both directions, by a cam 25 upon the cam shaft 7. This cam has upper and lower cam surfaces respectively engaging with cam surfaces 31 and 30 upon the piston 21 of the suction pump. The lower cam surface on the cam 25 also engages cam surfaces 26 upon the pistons 18 of the pressure pumps to actuate those pistons during their pressure stroke.

As the cam 25 must exert considerable pressure upon the cam surface 26 during this pressure stroke it is important that there should be as little sliding friction between the co-acting cam surfaces as possible. To this end the co-acting surfaces are made of similar pitch and are made to contact always at a point which divides the distance between the axis of the shaft 7 and the axis of the piston 18 in the ratio of the gearing 13, 16, in other words is over the point of contact of the pitch circles of the gear wheels. The lines of contact on the two surfaces are then of equal length and sliding friction is a minimum. The cam surfaces may be constructed in any desired form. One of the two surfaces may be replaced by a cam edge. But for minimum wear it is preferable to employ two slightly toroidal cam surfaces as illustrated or one toroidal cam surface co-acting with a cam surface of which the generator is straight.

The pressure piston 18 is moved through its suction stroke by engagement of the upper surface of cam 25 with the plane edge of a disc 27 which has a tapped bore and screws upon the threaded end of the piston. The stroke of the pressure pump is regulated by screwing up or down the nut 27. Since the edge of the nut co-acting with the cam 25 is plane the pitch of the upper surface of the cam 25 is made double as great as that of its lower surface (which co-acts with a cam surface 26 of similar pitch) to give the same maximum stroke. Abutments 28 limit the upward screwing of the regulating nuts. In the highest position of the nuts the cam 25 turns freely in the groove formed between the regulating nut and the cam surface 26 so that no oil is delivered. An index 29 on the piston 18 and numerals on the regulating nut 27 serve to indicate the relative amounts of oil supplied in the several positions of the nut.

The suction piston 21 is of larger diameter than the pressure pistons 18, and it has a longer stroke due to its cam surfaces 30 and 31 co-acting with the cam 25 being made of greater pitch than the cam surface 26 of the pressure pistons. The sliding which this necessitates is not important since the pressure needed to operate the suction piston on both strokes, like the pressure needed to move the piston 18 through its suction stroke, is small.

The gear wheels 13, 16 must so mesh that the stout tooth 15 on each gear wheel 16 enters in turn the widened tooth space 14. This widened tooth space 14 and the stouter tooth 15 are so located with reference to the ports 17, 20 and to the cams 25, 26, 30, 31 that during the suction stroke of the pistons the ports 17 of the pressure pistons 18 open to the suction channels 19 and the port 20 of the suction piston 21 to the inlet 22 of the suction pump, while during the pressure stroke the pump spaces are connected respectively with the pressure channels 23 of the pressure pumps and the pressure channel 24 of the suction pump.

The path of the oil through the lubricating apparatus is indicated by arrows. The excess oil supplied by the suction pump rises from the common annular space 32 through the slot 33 into the hollow upper part of the block 2 in which the cams and the gear wheels 13, 16 are located, and is maintained at a level suitable for lubrication of these parts by an overflow tube 34. Oil escaping through this passes through the bore 35 to the fast-running driving mechanism through which shaft 3 drives the cam shaft 7 at a reduced speed. the overflow tube 36 keeps the oil in the casing 1 at a suitable level, and the excess oil drops through the sight glass 37 into a pipe leading back to the oil reservoir.

I claim:

1. A force-feed lubricating apparatus comprising a common cam shaft, a plurality of pumps with reciprocatory and rotary pistons controlling the admission and delivery of lubricant and arranged around said cam shaft parallel to and equidistant from it, gearing connecting said cam shaft with the pistons to rotate them, and a cam on said cam shaft and a cam surface upon each piston of equal pitch with said cam and contacting with said cam.

2. A force-feed lubricating apparatus comprising a common cam shaft, a plurality of pumps with reciprocatory and rotary pistons controlling the admission and delivery of lubricant and arranged around said cam shaft parallel to and equidistant from it, gearing connecting said cam shaft with the pistons to rotate them, a cam on said cam shaft and a cam surface upon each piston of equal pitch with said cam and contacting with one side of said cam, and a nut upon each piston adjustable thereon and contacting with the other side of said cam.

3. A force feed lubricating apparatus comprising a common cam shaft, a plurality of pumps with reciprocatory and rotary pistons controlling the admission and delivery of lubricant and arranged around said cam shaft parallel to and equidistant from it, gearing connecting said cam shaft with the pistons to rotate them, and a cam on said cam shaft and a cam surface upon each piston of equal pitch with said cam and contacting with said cam at a point which divides the distance between the axis of the cam shaft and the axis of the pump piston in the ratio of the gearing connecting them.

4. A force-feed lubricating apparatus comprising a common shaft, a plurality of pumps with reciprocatory and rotary pistons controlling the admission and delivery of lubricant and arranged around said cam shaft parallel to and equidistant from it, gearing with irregular teeth connecting said cam shaft with the pistons to rotate them, and a cam on said cam shaft and a cam surface upon each piston of equal pitch with said cam and contacting with said cam.

5. A force-feed lubricating apparatus comprising a common cam shaft, a plurality of pumps with reciprocatory and rotary pistons controlling the admission and delivery of lubricant and arranged around said cam shaft parallel to and equidistant from it, gearing connecting said cam shaft with the pistons to rotate them, a cam on said cam shaft, a cam surface upon each piston of equal pitch with said cam and contacting with said cam, a driving shaft at right angles to said cam shaft, and a ratchet gearing connecting said driving shaft with said cam shaft to turn it.

6. A force-feed lubricating apparatus comprising a plurality of pressure pumps, at least one suction pump feeding the pressure pumps and of capacity to supply an excess of oil thereto, means for receiving the excess oil, a common shaft actuating all of said pumps, and an overflow pipe to convey away the excess oil from said receiving means.

7. A force-feed lubricating apparatus comprising a plurality of pressure pumps, at least one suction pump feeding the pressure pumps and of capacity to supply an excess of oil thereto, means for receiving the excess oil, a common shaft actuating all of said pumps, a sight glass, and an overflow pipe conveying to the sight glass excess oil from said receiving means.

8. A force-feed lubricating apparatus comprising a common shaft, a plurality of pressure pumps, at least one suction pump feeding the pressure pumps, gearing, a cam shaft, all of said pumps having reciprocatory and rotary pistons controlling the admission and delivery of lubricant and arranged around said cam shaft parallel thereto and equidistant from the gearing which connects said cam shaft with the pistons to rotate them, cam surfaces on the pressure pump pistons, a cam surface on said suction pump piston of steeper pitch than the cam surfaces on the pressure pistons, and a cam upon said common shaft engaging the cam surfaces of all of said pistons to reciprocate them.

EUGEN LUDWIG MÜLLER.